United States Patent

[11] 3,585,902

| | | |
|---|---|---|
| [72] | Inventor | Robert L. Anderson<br>Tustin, Calif. |
| [21] | Appl. No. | 817,977 |
| [22] | Filed | Apr. 21, 1969 |
| [45] | Patented | June 22, 1971 |
| [73] | Assignee | Bertea Corporation<br>Irvine, Calif. |

[54] GAIN MECHANISM AND SYSTEM THEREFOR
29 Claims, 8 Drawing Figs.

[52] U.S. Cl............................................. 91/363,
91/186, 91/367, 91/413, 92/138, 74/102, 74/522
[51] Int. Cl.........................................F15b 13/16,
F15b 13/06
[50] Field of Search.......................... 91/391 A,
363 A, 367, 413, 186; 74/522, 527

[56] References Cited
UNITED STATES PATENTS
1,780,713  11/1930  McEwan........................ 74/522

| 2,305,070 | 12/1942 | Butler et al. ................. | 74/522 |
| 2,908,183 | 10/1959 | Giovanni...................... | 74/522 |
| 3,250,183 | 5/1966 | Gephart........................ | 91/391 A |
| 3,309,966 | 3/1967 | Cornillaud.................... | 91/391 A |
| 3,411,410 | 11/1968 | Westbury et al............. | 91/363 A |

Primary Examiner—Paul E. Maslousky
Attorney—Smyth, Roston and Pavitt

ABSTRACT: This disclosure describes a gain mechanism which may include a first member, shiftable means for selectively pivotally mounting the first member on a supporting structure for pivotal movement about any one of a plurality of pivotal axes, an input member drivingly connectable to the first member for driving the first member about any of the pivotal axes, and an output member drivingly connected to the first member and driven thereby when the first member is pivoted about any of the pivotal axes. A characteristic of the motion of the output member is changed in relation to the motion of the input member as a result of the shiftable means changing the pivotal axis about which the first member pivots.

INVENTOR:
Robert L. Anderson

ATTORNEYS

GAIN MECHANISM AND SYSTEM THEREFOR

BACKGROUND OF THE INVENTION

Modern jet aircraft, especially those used for commercial passenger carrying operations wherein flight safety considerations are of primary importance, utilize nearly complete redundancy throughout the flight control mechanisms. Each of the flight control surfaces are typically controllable by two independent control systems. The independent systems are arranged that safe flight operation can be maintained after one of these systems malfunctions.

An integrated hydraulically powered flight control package of the type currently in general use includes two actuators which may be in the form of a dual linearly extensible actuating device for positioning an aircraft flight control surface. The actuator is fluid responsive and fluid flow thereto is controlled by a valve which may be a mechanically operated slide valve having two valve sections formed on a common spool. One of the valve elements is served by one hydraulic power supply and the other valve section is served by second hydraulic power supply. The position of the spool controls the flow of fluid to and from the actuators and hence, the position of the control surface.

The position of the spool is controlled, in part, by first and second input actuators which are supplied with fluid under pressure from separate sources of fluid under pressure by suitable valves, such as electrohydraulic valves. Each of the input actuators includes a piston or movable member. The movements of the pistons of the two input actuators are summed and such motion is transmitted through an appropriate linkage to the valve spool to control the position of the latter.

If one of the input actuators fails as through a loss of fluid pressure, the centering springs thereof return the piston to a neutral position. This reduces the algebraic sum of the motions of the two pistons and results in erroneously positioning of the valve spool. Stated differently, upon failure of one channel, the system operates at less than full or normal gain thereby resulting in erroneously positioning of the valve spool and consequent error in positioning of the flight control surface.

SUMMARY OF THE INVENTION

The present invention provides a novel gain mechanism which is usable in many different systems, but which is particularly adapted for use in a fluid-operated, flight-surface, control system. The gain mechanism can be used to transmit motion from the input actuators to the spool of the spool valve. This motion is transmitted at a first gain when both of the channels or fluid systems are operating satisfactorily and is transmitted at a second gain response to a failure in one of the channels. Although the gain change can be any desired amount, in a system for controlling the position of a flight control surface, the gain change is preferably sufficient to completely compensate for the loss of input motion resulting from the failure of one of the input actuators. Thus, the gain mechanism of this invention, in effect, shifts gears when one of the channels fails, so that the overall gain of the entire system remains unchanged to thereby substantially completely eliminate adverse effects as a result of failure of one of the fluid systems.

The gain mechanism of this invention includes a first member preferably in the form of a gain link. A concept of this invention is to effect a gain change by changing the axis about which the gain link is pivoted. More particularly, the input motion is fed into the gain link at a first region thereof and output motion is taken from the gain link at a second region thereof. By changing the location of the pivotal axis about which the gain link is allowed to pivot, the ratio of the distances between the two regions of the gain link and the pivotal axes changes to thereby change the ratio of output motion to input motion. This concept is applicable whether or not the output motion is in the same or in a different direction from the input motion. It is also applicable even though the direction of the output motion may change when the pivotal axis is changed. In a preferred embodiment, however, the direction of the output motion does not change when the pivotal axis of the gain link is changed. Typically the pivotal axes are spaced and generally parallel.

Changing of the axis about which the gain link pivots is, at least ostensibly, a difficult concept to implement because it involves providing two mounting arrangements for the gain link, both of which must be quickly releasable when the other is operative. In addition, the operation and releasing of these mounting arrangements must be very reliable because of the stringent safety requirements of the system for which the gain mechanism is particularly adapted.

According to the present invention, the gain link is pivotally mounted adjacent one end on a movable mounting member. When both of the fluid systems are operational, the mounting member is held substantially stationary, and therefore, it mounts the gain link for pivotal movement about a first pivotal axis. However, when one of the fluid systems fails, the mounting member is automatically movable or releasable to thereby permit movement of the portion of the gain link to which it is pivotally connected. Preferably, the mounting member is held in a predetermined position by a biasing means which may be in the form of a spring detent. The use of biasing means to releasably or yieldably retain the mounting member in position is preferred because of its simplicity and reliability and because it automatically releases or yields when sufficient force is applied thereto to overcome the force of the biasing means.

The gain link can be mounted for pivotal movement about a second pivotal axis by causing appropriate cooperation between a movable arm and the gain link. The arm is normally held out of engagement with the gain link and is moved thereagainst only as desired, as when one of the fluid systems fails. When the arm engages the gain link, it retains the portion so engaged and causes the gain link to be mounted for pivotal movement about the second pivotal axis. The second pivotal axis can be formed in may different ways, and in the embodiment illustrated, the arm has a recess which engages an outer race of a bearing mounted on the gain link. With this arrangement the second pivotal axis is defined by the axis of the bearing.

When the gain link is mounted for pivotal movement about the second pivotal axis, the input motion applied to the gain link is of sufficient force to overcome the biasing means and thus render ineffective the means for mounting the gain link about the first pivotal axis. This permits pivotal movement of the gain link about the second pivotal axis.

Although the arm may be caused to operate, i.e. to mount the gain link for pivotal movement about the second pivotal axis, in response to any desired condition, it is particularly adapted to be operable in response to failure of either of the input actuators. The present invention detects a malfunction of the input actuators by sensing the pressure in the fluid systems for operating the actuators. If the supply pressure to either of the actuators drops below a predetermined value, the actuator cannot function properly and said arm actuator engagement to operate and the gain link effects a gain change.

To this end the arm is biased toward the gain link by a spring and it is urged from the gain link by pressure response means responsive to the pressure of the fluid in the two fluid pressure systems. When both of the system are operating, the force of the fluid pressure is sufficient to overcome the biasing means to therefore maintain the arm out of contact with the gain link. If there is a pressure drop in one of the fluid pressure systems, the biasing means exerts sufficient force on the arm to cause the latter to engage the gain link.

To make the arm hypersensitive to a predetermined loss of pressure in one of the fluid systems, a restraining element is preferably pivotally mounted on the arm with portions of the restraining element extending on opposite sides of the pivotal axis thereof. Two pressure responsive members are provided with these members being urged, respectively, against the portions of the restraining element by the force of fluid in the two systems. If there is a pressure loss in one of the systems, the pressure responsive member which in communication with the operational fluid system will be virtually unopposed and will be able to pivot the restraining element. When this occurs, the biasing means acting on the arm will be virtually unopposed and will be easily able to move the arm into engagement with the gain link.

With this construction a relatively light spring can be used and the arm is made immediately and reliably responsive to a preselected pressure loss in one of the fluid pressure systems. The arm and the means for moving the arm is response to a loss of pressure in one of the fluid pressure systems is particularly adapted for use in the gain mechanism of this invention. However, the arm and the operating means therefore could also be used as an actuator or indicator. For example, in response to a pressure loss in one of the systems, movement of the arm could cause actuation of another device, the operation of which is necessary when one of the systems fails.

The gain mechanism of this invention may be used in an autopilot system or in a stability augmenting system. This requires coaction between the gain mechanism and a second input motion which, by way of example, may be pilot input. This may be accomplished by using the gain link to drive an output member which is preferably pivotally mounted. The motion of the output member and the second input motion are algebraically summed to provide a control motion which controls the spool valve. In the autopilot system, the pilot input is locked out so that the only input to the spool valve is from the gain link.

The invention, both as to its organization and method of operation together with further features and advantages thereof may best be understood by reference to the following description taken in connection with the accompanying illustrative diagrams.

DESCRIPTION OF THE PREFERRED EMBODIMENTS

Figure 1:
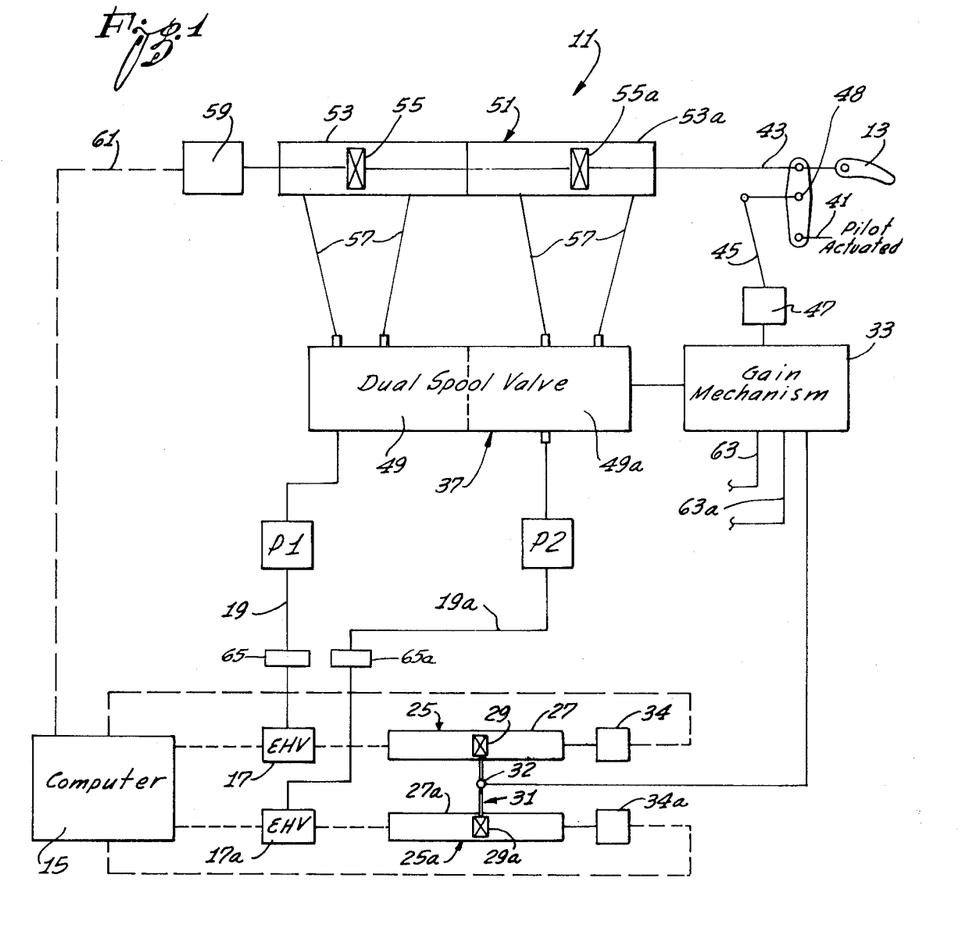
FIG. 1 is a schematic view of a system for controlling the position of a flight control surface of an aircraft which system is constructed in accordance with the teachings of the present invention.

General Description of the System (Fig. 1)

Referring to the drawings and in particular to FIG. 1 thereof, reference numeral 11 designates a control system constructed in accordance with the teachings of this invention. Although the system 11 may be utilized to perform many different control functions, in the embodiment illustrated the system 11 controls the position of a flight control surface 13. The system 11 is fluid operated and in the embodiment illustrated includes two independent sources P1 and P2 of fluid under sufficient pressure to perform the necessary control functions.

The various components of the systems 11 shown in FIG. 1 are provided for the pressure of controlling hydraulic fluid from the pressure source P1 and P2 to position the flight control surface 13. The system 11 is capable of operation in either the autopilot mode or the stability augmenting mode.

The system 11 includes a computer 15 which may be of conventional design. The computer 15 senses preselected flight conditions and provides identical electrical control signals to electrohydraulic valves 17 and 17a. The computer 15 may include various types of sensors including gyroscopes accelerometers, compasses, altimeters, etc. depending upon whether the system is designed as an autopilot system or a stability augmenting system.

The valves 17 and 17a are connected, respectively, by conduit means 19 and 19a to the sources of fluid under pressure or fluid pressure systems P1 and P2. The conduit means 19 and 19a diagrammatically represents the usual conduits necessary to connect valves to a pressure system. Similarly, the other conduits shown in FIG. 1 merely illustrate that the two fluid pressure sources P1 and P2 provide fluid under pressure to a particular component without illustrating actual piping connections. Return fluid is connected to one or more sumps (not shown in FIG. 1) which may be open or closed.

The valves 17 and 17a may be of conventional design and control flow of the hydraulic fluid from the sources P1 and P2 to a pair of input actuators 25 and 25a in accordance with the electrical control signals received from the computer 15. The input actuators 25 and 25a include, respectively, cylinders 27 and 27a and pistons 29 and 29a. The pistons 29 and 29a are interconnected by a summing link 31 a region 32 of which is mechanically connected to gain mechanism 33. Movement of the pistons 29 and 29a is controlled by the valves 17 and 17a, respectively, which control the flow of fluid to and from the cylinders 27 and 27a. Thus, the movement of the pistons 29 and 29a and of the summing link 31 is controlled by the computer 15. Transducers 34 and 34a are controlled by the pistons 29 and 29a, respectively, to provide electrical feedback signals to the computer 15. In the autopilot and stability augmenting modes the transducers 34 and 34a provide feedback signals which indicate the position of their respective pistons.

When the system 11 is fully operational, the pistons 29 and 29a will normally move substantially together. The resulting movement of the summing link 31 constitutes a mechanical input motion to the gain mechanism 33. The gain mechanism transmits the input motion via a suitable mechanical connection to a valve 37 which, in the embodiment illustrated, is in the form of a dual spool valve. In the stability augmenting mode, a second input motion is fed to the gain mechanism 33 from a primary summing link 39. In the stability augmenting mode, the input to the primary summing link 39 is in the form of a pilot input fed thereto by a mechanical connection 41, and a second input fed thereto by a mechanical connection 43 as a function of the position of the flight control surface 13. The inputs from the mechanical connections 41 and 43 move the summing link 39 in the stability augmenting mode and this motion is transmitted via a mechanical linkage 45 and a second input to the gain mechanism 33. The gain mechanism 33 algebraically sums the input motions from the link 39 and the input actuators 25 and 25a to provide a combined control motion for controlling the valve 37.

In the autopilot mode an autopilot lockout device 47 rigidly mounts an intermediate region 48 of the primary summing link 39 for pivotal movement thereabout. With this construction, the input from the mechanical connection 43 is fed through the primary summing link 39 back to the pilot via the mechanical connection 41 and thus, the pivot provides no input to the valve 37. The autopilot lockout device 47 can be so arranged that in the event of an emergency, the pilot can override the lockout device to provide an input to the valve 37.

The dual spool valve 37 preferably has substantially identical valve sections 49 and 49a which are in communication with the supply P1 and the supply P2, respectively. The valve sections 49 and 49a are controlled by the motion fed thereto from the gain mechanism 33.

Actuator means 51 which is preferably in the form of a dual extensible actuator, is controlled by the valve 37. The actuator 51 controls the position of the flight control surface 13 through the mechanical connection 43. In the embodiment illustrated, the actuator means 51 includes two cylinder sections or actuators 53 and 53a having pistons 55 and 55a therein, respectively. The pistons 55 and 55a are mechanically connected together by a portion of the mechanical connection 43 to thereby drive the flight control surface 13. The position of the pistons 55 and 55a is controlled by the valve sections 49 and 49a, respectively, which control fluid flow to and from the actuator 51.

In the autopilot mode, a position feedback transducer 59 senses the position of the flight control surface 13 and produces an electrical feedback signal responsive to the position of the flight control surface. This feedback signal is fed through an electrical connection 61 back to the computer 15.

The hydraulic system thus far described is completely redundant in that it includes two separate sources of fluid under pressure P1 and P2 as well as independently operable input actuators 25 and 25a, independently operable valve sections 49 and 49a and independently operable actuators 53 and 53a including the pistons 55 and 55a. It is apparent that the system is so arranged that in the event that pressure is lost in one of the systems or if one of the components of the redundant system malfunctions, the other half or channel of the system 11 can accurately control the position of the flight control surface 13.

The summing link 31 algebraically sums the distances travelled by the pistons 29 and 29a so that in the event that one of the actuators 25 and 25a fails, the motion of the region 32 of the summing link 31 is reduced. Ordinarily this would result in the overall system operating at less than full gain. However, with the present invention, the gain mechanism 33 senses the malfunction and changes the gain of the gain mechanism an amount sufficient to compensate for the reduction in motion of the region 32. Although the gain mechanism may be made responsive to various system conditions, in the embodiment illustrated, it is responsive to a drop in supply pressure of either of the systems P1 and P2 below a predetermined value to effect a gain change. To this end, the gain mechanism is connected to the sources P1 and P2 of fluid under pressure by conduits 63 and 63a the full length of which is not shown in FIG. 1.

Figure 2A:
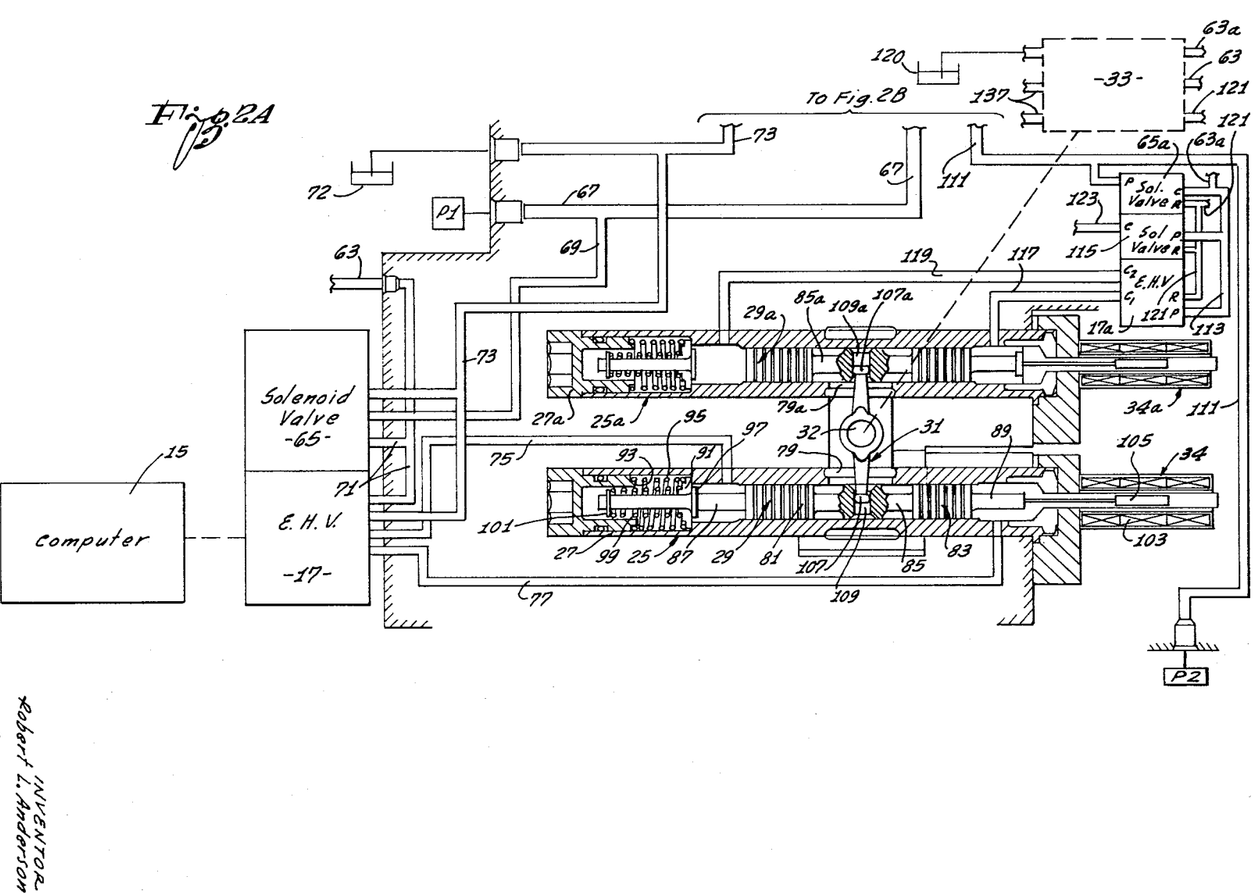
FIG. 2A is a schematic view partially in section of the input actuators and of the means for operating same with the pistons of the actuators being centered or in the neutral position.

THE INPUT ACTUATORS (FIG. 2A)

The operation of the input actuators 25 and 25a is explained in greater detail with reference to FIG. 2A. To energize the system, the pilot pushes an appropriate button to energize three-way solenoid valves 65 and 65a. With the solenoid valve 65 energized, fluid under pressure from the pressure source P1 flows via conduits 67 and 69 through the solenoid valve 65 and a conduit 71 to the valve 17. The conduit 71 also conducts the fluid under pressure to the conduit 63 which in turn transmits the fluid under pressure to the gain mechanism 33 to thereby provide a signal indicating the pressure of the fluid in the P1 system downstream of the valve 17. The solenoid 65 is a three-way valve which supplies fluid under pressure from the source P1 to the valve 17 when the valve 65 is energized. When the solenoid valve 65 is deenergized the valve 65 terminates the flow of fluid therethrough from the source P1 and allows fluid in the conduit 63 to flow to a sump 72 via a return conduit 73.

The valve 17 receives an electrical signal from the computer 15 and proportions flow of supply fluid between the conduits 75 and 77 which lead, respectively, to opposite faces of the piston 29 with the conduit of the fluid under pressure to the valve 17 being conducted to return via the return conduit 73. The valve 17 is a four-way valve and may be of the askania jet pipe-type. Assuming, for example, that the control signal from the computer 15 calls for movement of the piston 29 to the left, the valve 17 would supply fluid through the conduit 77 to the right end of the piston 29 thereby forcing fluid from the left end of the piston 25 through the conduit 75 to the valve 17 and from there to return via the return conduit 73.

As shown in FIG. 2A, the cylinder 27 has a central opening 79 and the piston 29 includes two piston sections 81 and 83 which are slidably mounted within the cylinder. The piston sections 81 and 83 are joined by a connecting rod 85 and shafts 87 and 89 project axially from the outer ends of the piston sections 81 and 83, respectively.

Means is provided for centering the piston 29 or moving the piston to the neutral position in the event of a loss of hydraulic pressure in the P1 system. In the embodiment illustrated, such means includes a collar 91 movable axially within the cylinder 27 and slidably receiving the shaft 87, a shoulder 93 formed on the cylinder 27 and a spring 95 acting between the shoulder and collar. If the shaft 87 moves to the left from the neutral position shown in FIG. 2A, a flange 97 thereon engages the collar 91 and moves the latter to the left to thereby compress the spring 95.

A second spring 99 acts between a flange 101 rigidly mounted on the shaft 87 and the collar 91. If the shaft 87 moves to the right from the neutral position shown in FIG. 2A, the flange 101 moves therewith to compress the spring 99 between the flange 101 and the collar 91. In the event of a loss of pressure in the P1 system, there will be a corresponding drop of pressure in the conduits 75 and 77 and the force of whichever of the springs 95 and 99 is compressed will be sufficient to return the piston 29 to the neutral position shown in FIG. 2A.

The transducer 34 includes one or more coils 103 and a core 105 mounted on the shaft 89 for movement therewith. With this construction, the core 105 moves with the piston 29 and can be used to provide a feedback signal indicative of the position of the piston in both the stability augmenting mode and the autopilot modes.

The input actuator 25a is identical to the input actuator 25 and is not described in detail herein. To the extent that the input actuator 25a is described, reference numerals corresponding to the reference numerals used in the description of the actuator 25 are utilized with the letter a added.

The summing link 31 has end portions 107 and 107a which are received within openings 109 and 109a of the connecting rods 85 and 85a, respectively. The summing link 31 projects through the openings 79 and 79a of the cylinders 27 and 27a, respectively, and these openings are sufficiently wide to permit the necessary movement of the summing link. Thus, the summing link 31 is driven by the pistons 29 and 29a and the length of the motion of the summing link is a function of the motion of both of these pistons. As explained in greater detail with reference to FIGS. 3 and 4, the motion of a region 32 of the summing link 31 is transmitted to the gain mechanism 33.

The solenoid valve 65a is a three-way valve which is operated by the pilot simultaneously with the energization of the solenoid valve 65. Energization of the solenoid valve 65a causes opening thereof to admit fluid under pressure from the system P2 through a supply conduit 111, the solenoid valve 65a and a supply conduit 113 to the valve 17a and to a lockout solenoid valve 115. The valve 17a receives the same control signal from the computer 15 as does the valve 17 and in response thereto controls the flow of fluid to and from the actuator 25a, such fluid being transmitted through the conduits 117 and 119. Portions of the fluid under pressure not required by the valve 17a are conducted to a sump 120 via a return conduit 121 and the case of the gain mechanism. Thus, the valve 17a functions in the same manner as the valve 17 in response to a corresponding electrical control signal to control the movements and position of the piston 29a. Energization of the valve 65a permits fluid to flow from the conduit 113 through the conduit 63a to supply fluid under pressure to the gain mechanism 33.

When the solenoid 65a is energized, it supplies fluid under pressure from the system P2 to the solenoid valve 115. The valve 115 is also a three-way valve which connects to return conduit 121 in the deenergized condition. When the pilot manually energizes the solenoid valve 115, the solenoid valve 115 opens to supply fluid under pressure to the autopilot lockout device 47 via a conduit 123. This actuates the autopilot lockout to thereby cause the system to operate in the autopilot mode in which the gain mechanism only receives input motion from the input actuators.

Figures 2B, 6:
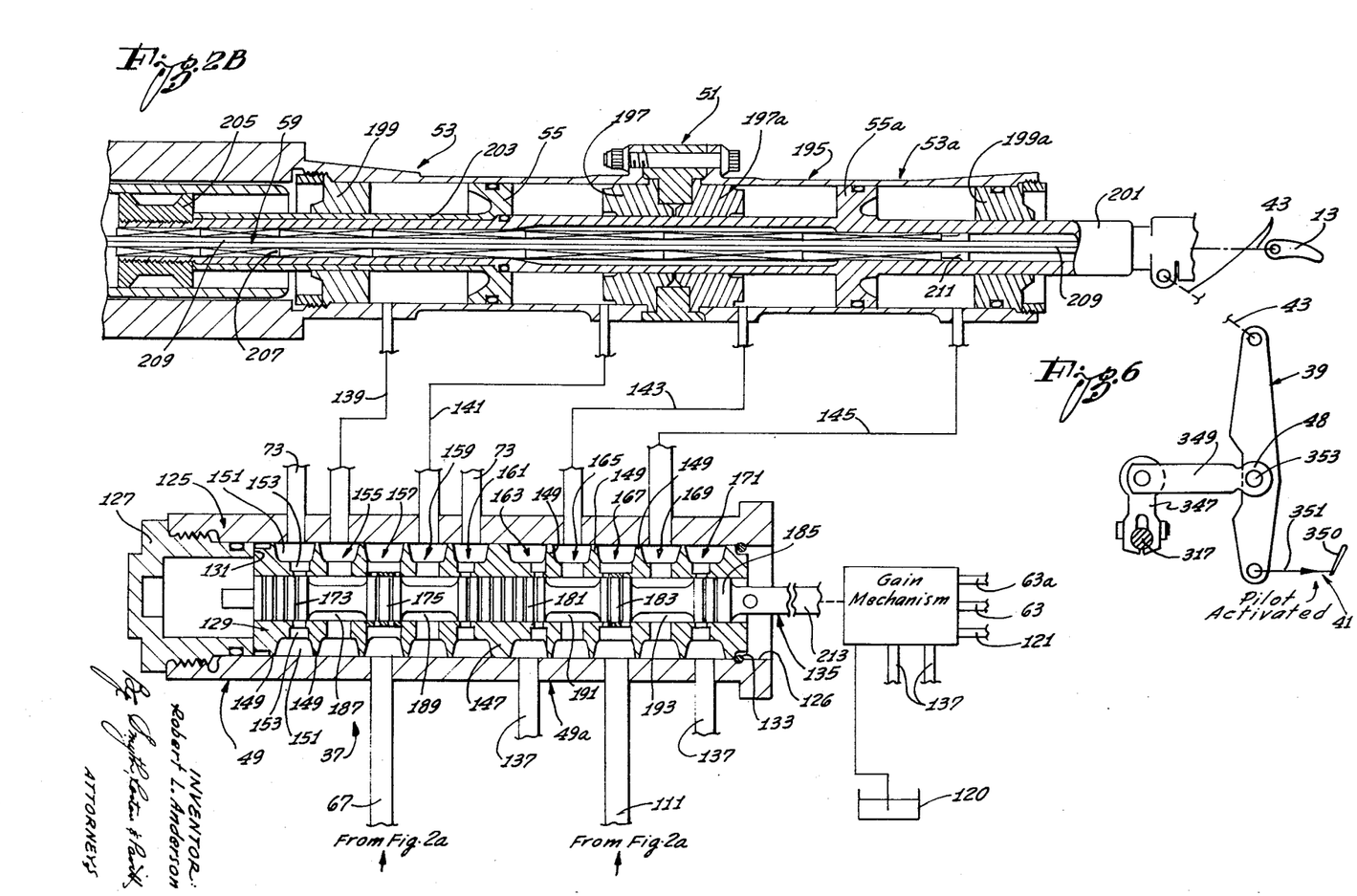
FIG. 2B is a schematic view practically in section of a preferred form of actuator for positioning the flight control surface and of a preferred form of spool valve for controlling the actuator.
FIG. 6 is an elevational view taken generally along line 6—6 of FIG. 3 and illustrating the primary summing link in side elevation and the linkage connected to the primary summing link.

THE SPOOL VALVE AND ACTUATORS (Fig. 2B)

With reference to FIG. 2B, the valve 37 includes a housing 125 having a passageway 126 extending therethrough with one end of the passageway being closed by an end cap 127. A sleeve 129 is fixedly retained within the passageway 126 by an end face 131 of the cap 127 and by a retaining ring 133. A spool 135 is slidably mounted within the sleeve 129.

The housing 125 is connected to fluid pressure sources P1 and P2 via the conduits 67 and 111, respectively. The housing 125 is connected to return via the conduits 73 and the conduits 137 which lead to return via the case of the gain mechanism 33 and the conduits 122 and 121 (FIG. 2A). The valve 37 is dual valve and conduits 139 and 141 provide fluid flow paths between the left half of the valve 37 (valve section 49) and the opposed faces of the pistons 55 of the actuator 51. Conduits 143 and 145 provide fluid flow paths between the right half of the valve 37 (valve section 49a) and the opposite faces of the piston 55a.

The sleeve 129 has a plurality of grooves and ports which define numerous fixed fluid passages within the housing 125. The sleeve 129 has a centrally located dividing flange 147 which divides the valves into two independent halves, i.e. the valve sections 49 and 49a (Fig. 1).

The sleeve 129 has a plurality of annular flanges 149 spaced axially along its length. The two flanges 149 at the left end of the sleeve 129 define an annular groove 151 which extends completely around the sleeve 129. A pair of axially aligned ports 153 extend radially inwardly from opposite sides of the groove 151. Similar port and groove arrangements are defined by the sleeve 129 in axially spaced relationship and are designed by reference characters 155, 157, 159, 161, 163, 165, 167, 169 and 171, respectively. All of the port and groove arrangements are functionally identical except for the port and groove arrangements 157 and 167, each of which has two pairs of radially aligned ports as illustrated.

The spool 135 has five lands 173, 175, 181, 183, and 185 with adjacent lands being interconnected by reduced diameter portions of the shaft defining respectively annular grooves 187, 189, 191 and 193. As described in greater detail hereinbelow, axial sliding movement of the spool 135 controls the flow of fluid to and from the actuator 51.

DESCRIPTION OF THE ACTUATOR (Fig. 2B)

The actuator 51 includes an elongated housing 195 which is divided into left and right-hand sections by a pair of generally annular plugs 197 and 197a. A pair of generally annular end plugs 199 and 199a cooperate with the plugs 197 and 197a to define a pair of working cylinders in which the pistons 55 and 55a operate, respectively. An actuator or shaft 201 extends through the housing 195 and forms a portion of the mechanical linkage or connection 43 which drivingly interconnects the pistons 55 and 55a and the flight control surface 13.

The piston 55a is formed integrally with the actuator shaft 201. The piston 55 is formed on the end of a hollow shaft 203 which is retained on the actuator shaft 201 by a nut 205.

The actuator shaft 201 is hollow and the left end thereof is open, to permit the latter to house the transducer 59. The transducer 59 includes one or more coils 207 suitably fixedly retained within the actuator shaft 201 and a core 209 rigidly affixed to the right-hand end of the actuator shaft 201 for movement therewith. The coil 207 terminates at the right end thereof in a plug 211 which is mounted within the actuator shaft 201 and the left end of the coil may be attached to fixed mounting means (not shown) for retaining the coil against movement as the actuator shaft 201 moves. Thus, when the actuator shaft 201 moves, the core 209 moves therewith to provide an electrical feedback signal which is a function of the position of the pistons 55 and 55a and hence, a function of the position of the flight control surface 13a. This transducer will ordinarily only be required for operation in the autopilot mode so that when the system 11 is used for the stability augmenting mode, this transducer can be eliminated.

Figure 3:
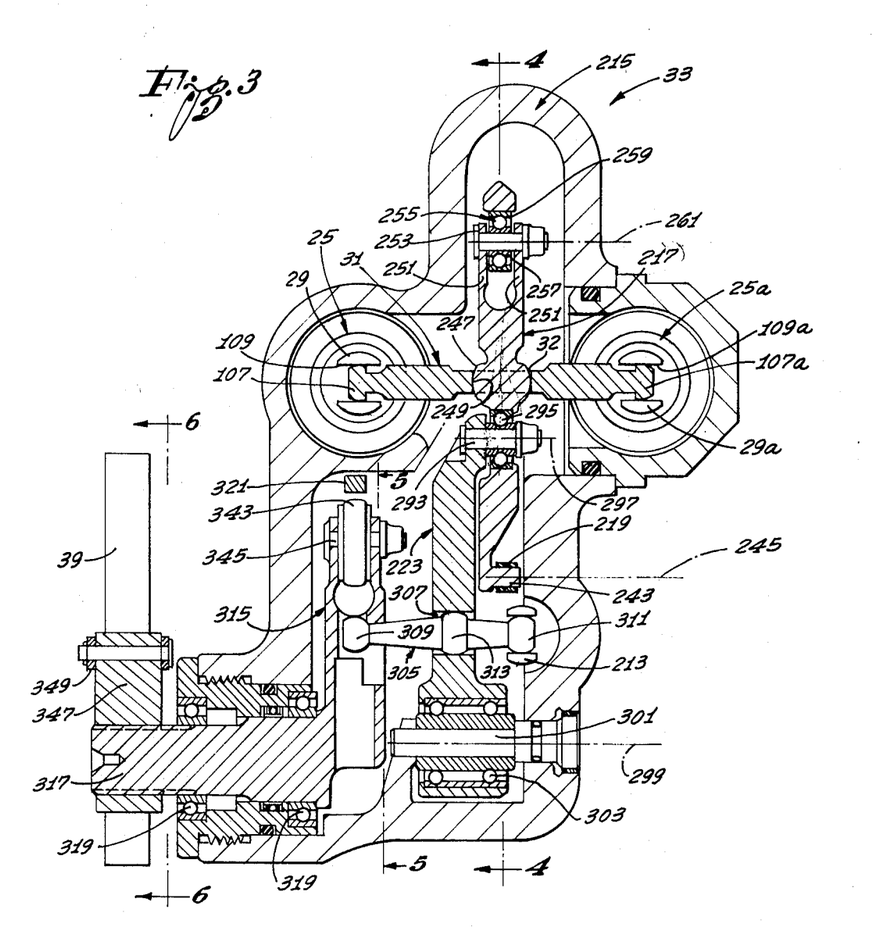
FIG. 3 is a sectional view taken generally along line 3-3 of FIG. 4 and illustrating a gain mechanism constructed in accordance with the the teachings of this invention.
Figure 4:
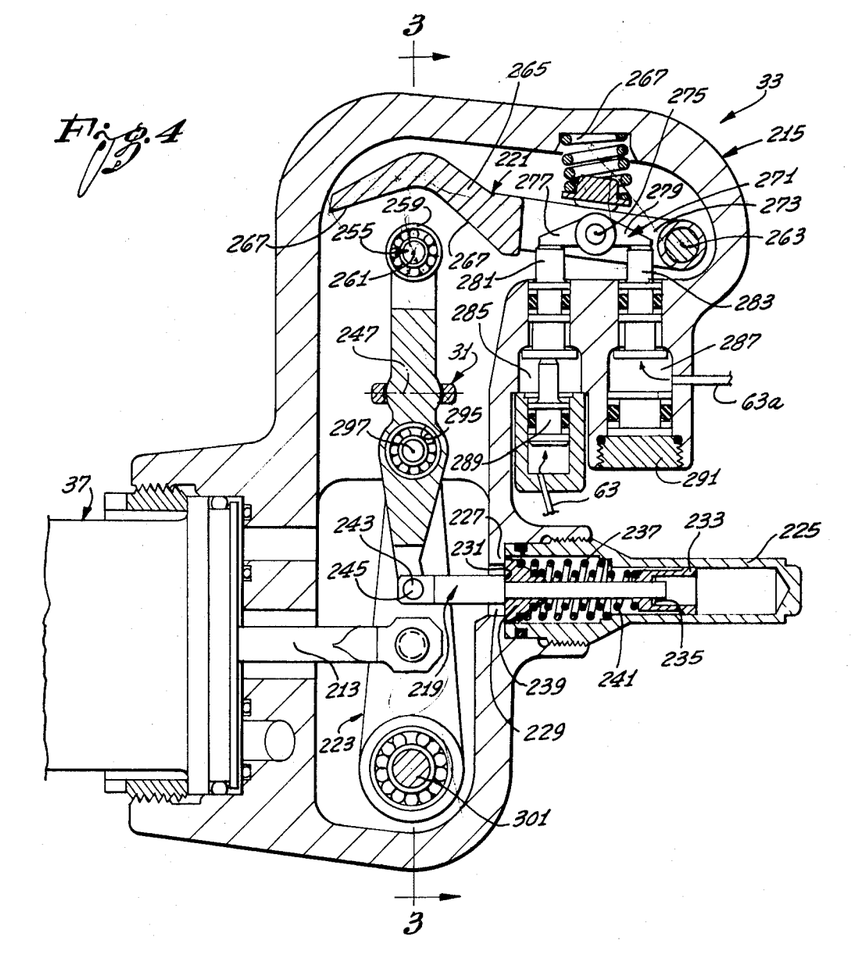
FIG. 4 is a sectional view of the gain mechanism taken generally along line 4—4 of FIG. 3 illustrating the gain link in a neutral position with both fluid systems operational.
Figure 4A:
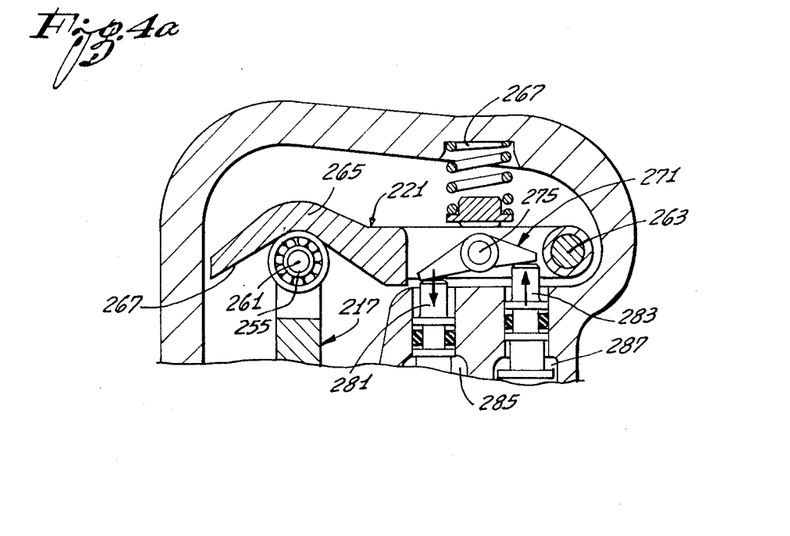
FIG. 4A is a fragmentary sectional view of a portion of the gain mechanism shown in FIG. 4 illustrating the position of the components after a pressure drop in one of the systems.

THE GAIN MECHANISM (FIGS. 3, 4 and 4A)

The gain mechanism 33 receives input motion from the summing link 31 and transmits the latter to an operating element 213 (FIG. 4), which is directly mechanically interconnected to the spool 135 (not shown in FIG. 4) of the valve 37. The gain of the gain mechanism 33 is at a first predetermined value when pressure in both of the pressure systems P1 and P2 is above a predetermined value and the gain is at a second value when the pressure in either of these systems drops below such predetermined value.

The gain mechanism 33 generally includes a housing 215 in which a gain link 217 is mounted by a mounting member 219 adjacent the lower end of the gain link. The housing is in communication with return fluid from the conduits 137 (FIG. 2B). An arm or actuator 221 is selectively engageable with the opposite end portion of the gain link 217 to cause the latter to be pivotally mounted about a second pivotal axis. The gain link 217 drives the crank or output member 223 which is mechanically interconnected to the operating element 213.

More specifically, the housing 215 includes a removable detent housing 225 which terminates inwardly adjacent an annular shoulder 227 which in turn surrounds an opening 229 in the housing. The mounting member 219 is in the form of a stepped shaft having a shoulder 231 intermediate the ends thereof. The mounting member 219 projects part way into the detent housing 225 and the outer end thereof is received within a tubular plunger 233 which is slidable axially in the housing 225. The mounting member 219 is loosely received within the tubular plunger 233 so that the mounting member can move to the right without imparting movement to the plunger; however, a pin 235 is fixed to the outer end of the mounting member 219 so that when the mounting member moves to the left, the plunger also moves to the left.

A spring 237 acts against the detent housing 225 at the right end thereof and urges an axially movable tubular member 239 to the left toward the shoulder 231 of the mounting member 219. A second spring 241 acts between the tubular member 239 and the plunger 233. The diameter of the passage to the tubular member 239 is sufficient to permit the reduced diameter portion of the mounting member 219 to slide freely therein; however, the shoulder 231 is too large to pass through the tubular member 239, and thus, movement of the mounting member 219 to the right from the position shown in FIG. 4 forces the tubular member to the right.

With the mounting member 219 in the neutral position illustrated, the springs 237 and 241 act to prevent movement of the mounting member to the right and to the left, respectively. Thus, these springs act as a spring detent or centering device which normally maintains the mounting member 219 in the predetermined neutral position shown in FIGS. 3 and 4. The spring force can be overcome when predetermined conditions arise as described more fully hereinbelow.

The lower end of the gain link 217 can be pivotally affixed to the mounting member 219 in any suitable manner. In the embodiment illustrated, a stub shaft 243 is formed integrally with the gain link 217 and is pivotally received within an opening in the mounting member 219 to define a first pivotal axis 245 which extends generally transverse to the longitudinal dimension of the gain link.

As shown in FIGS. 3 and 4, the gain link 217 has a part spherical portion 247 which is received within a part spherical opening 249 located at the region 32 of the summing link 31. The part spherical portion 247 and the opening 249 cooperate to permit limited universal movement of the summing link 31 relative to the gain link 217. The end portions 107 and 107a (FIG. 3) which are received within the openings 109 and 109a are also part spherical to permit limited universal movement between the end portions of the gain link and their respective piston. With this construction it is apparent that the link 31 operates to algebraically add the movements of the pistons 29 and 29a. Thus, the movement of the spherical opening 249 and hence of the spherical region 247 and the gain link 217 is a function of the motion of the pistons 29 and 29a. In the embodiment illustrated, the region 247 is located halfway between the end portions 107 and 107a, and accordingly, the motion of the region 247 equals $(x+y)/2$ where $x+y$ represent the distances traveled by the pistons 29 and 29a, respectively. Stated more broadly, the length of movement of the region 247 equals $(x+y)/k$ where $k$ is a constant, the value of which is dependent upon the relative distances between the center of the opening 249 and the end portions 107 and 107a. Thus, by moving the area of connection between the link 31 and the gain link 217, the movement of the pistons 29 and 29a can be algebraically summed as desired.

The upper end of the gain link 217 is forked to define a pair of spaced flanges 251 (FIG. 3) through which a pin 253 extends. The pin 253 is mounted on the flanges 251 and is used to mount a ball bearing 255. The ball bearing 255 is conventional and includes an inner ring 257 which may be affixed to the pin 253 and an outer ring 259. The bearing 255 defines a second pivotal axis 261 for the gain link 217. The pivotal axis 261 is parallel to the pivotal axis 245 and as shown in FIGS. 3 and 4, is located closely adjacent the upper end of the gain link 217.

With reference to FIGS. 4 and 4A, the arm 221 is suitably pivotally mounted within the housing 215 for pivotal movement about a pivotal axis 263 between the positions shown in FIGS. 4 and 4A. The pivotal axis 263 is preferably substantially parallel to the pivotal axes 245 and 261 and in the engaged illustrated is the same horizontal plane as the axis 261. Of course, the gain mechanism 33 can be used in any desired spatial orientation and accordingly, references herein to horizontal and vertical have reference only to the orientation which has been selected for depicting this particular embodiment of the invention.

The arm 221 has a generally hook-shaped end portion 265 with tapering cam surfaces 267 which form a downwardly opening generally V-shpaed recess for receiving and engaging the outer ring 259 of the ball bearing 255. A coil spring 267 acts between the upper side of the arm 221 and the housing 215 to bias the arm 221 downwardly or counterclockwise about the pivotal axis 263 as viewed in FIG. 4.

A restraining element 271 is pivotally mounted on a side face 273 of the arm 221 for pivotal movement about a pivotal axis 275. The pivotal axis 275 is parallel to the axis 263. End portions 277 and 279 project outwardly on opposite sides of the pivotal axis 275. The lower faces of the end portions 277 and 279 are planar and are engaged by fluid pressure responsive movable pistons 281 and 283, respectively. The pistons 281 and 283 are mounted within cylinders 285 and 287, respectively, which are formed by the housing 215. The lower face of the piston 281 is engaged by a second piston 289 which is also slidable within the cylinder 285. The lower faces of the pistons 283 and 289 are normally in communication with fluid at supply pressure received through the conduit 63a and 63, respectively. The space between the two pistons 281 and 289 is preferably open to return. The lower end of the cylinder 287 is closed by a threaded plug 291.

Normally, with fluid at supply pressures acting on the pistons 287 and 289, these pistons urge the restraining element 271 and hence the arm 221 upwardly against the force of the spring 267 to move the hook-shaped end portion 265 of the arm completely out of contact with ball bearing 255 as shown in FIG. 4. With the supper end of the gain link 217 unrestrained, the gain link pivots about the axis 245 in response to input motion from the summing link 31.

However, should the supply pressure in either of the conduits 63 and 63a, for example the conduit 63a, drop below a predetermined value, then the force acting on the piston 281 would be sufficient to pivot the restraining element 271 clockwise about the axis 275 thereby depressing the piston 283 and its cylinder. With the restraining element 271 clockwise, it would not be operative to restrain the arm 221 against the biasing action of the spring 267. Thus, the spring 267 would pivot the arm 221 counterclockwise about the axis 263 to cause the surfaces 267 to engage the bearing 255 and cam the latter toward the center of the V-formed by the surfaces 267. This has the effect of rendering the second pivotal axis 261 operative as a pivotal axis for the gain link 217. In response to further input motion from the summing link 31, the gain link 217 will pivot about the axis 261 compressing the springs 237 and 241 as may be necessary. The output member 223 is connected adjacent the upper end thereof to an intermediate region of the gain link 217 by a pin 293 which is received in a ball bearing 295 of the gain link. Thus, the output member 223 and the gain link 217 are pivotally connected about an axis 297 which is parallel to the axes 245 and 261. The lower end of the output member 223 is mounted for pivotal movement about a pivotal axis 299 by a stub shaft 301 and a bearing 303. Thus, pivotal movement of the gain link 217 about either of the axes 245 or 261 causes pivotal movement of the output member 223 about the axis 299. The axis 299 is preferably to the axes 245 and 261.

When the gain link is pivoting about the axis 261, the gain link will move vertically very slightly because it must "follow" the arm 223. The arm 221 is spring biased downwardly and therefore can easily accommodate such vertical movement. Similarly, the mounting member 219 is sufficiently loosely mounted within the housing 225 so as to accommodate the vertical movement.

It can be seen that by shifting the pivotal axis from the axis 245 to the axis 261 that a gain change is effected. In the embodiment illustrated, the gain utilizing the axis 261 is twice the gain utilizing the axis 245. Of course, the amount of the gain change can be varied by changing one or more dimensions of the device. For example, by moving any one of the summing link 31, the axis 245, 261 or 297, the gain of the mechanism will be altered. With the embodiment illustrated, the output lies intermediate the input and the axis 245 and therefore is less than the input motion utilizing the axis 245 whereas the input lies intermediate the output and the axis 261 so that when this latter axis is used, the output will exceed the length of the input.

The motion from the pivoting output member 223 is transmitted through an auxiliary summing link 305 which extends through an opening 307 in the output member to the operating element 213. The summing link 305 has partially spherical end portions 309 and 311 and a part spherical intermediate portion 313. With the latter being receiving within the opening 307 and with the end portions being received within suitable openings in the operating element 213 and an arm 315, respectively. As described more fully hereinbelow, with reference to the autopilot lockout device 47, with the system operating in the autopilot mode, the arm 315 and hence the end portion 309 are held stationary so that the input actuators 25 and 25a through the gain link 217 and crank 223 provide the sole input to the operating element 213.

Figure 5:
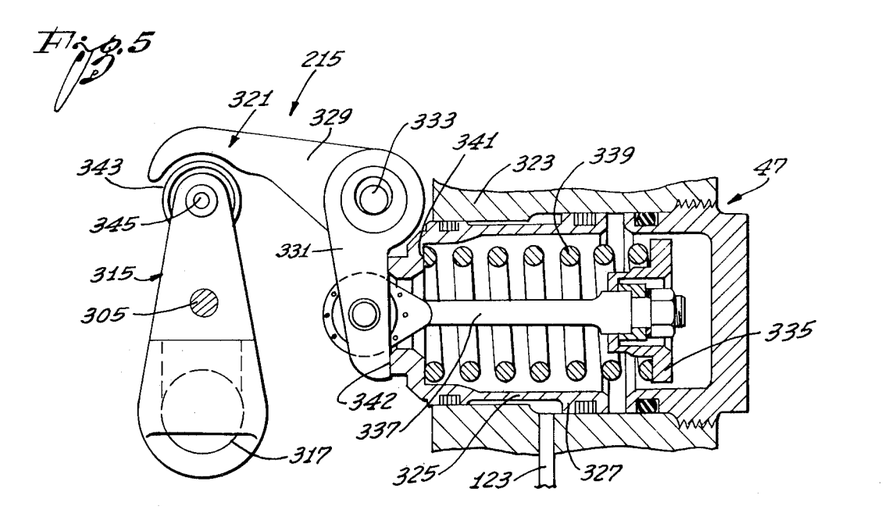
FIG. 5 is an elevational view taken generally along line 5-5 of FIG. 3 and illustrating the autopilot lockout device.

THE AUTOPILOT LOCKOUT DEVICE (FIGS. 3 and 5)

The arm 315 is mounted for pivotal movement with a shaft 317 which is rotatably mounted within a housing 215 by bearings 319. The pivotal axis for the arm 315 is parallel to the axis 245 and 261. In the autopilot mode, the arm 315 is normally held against pivotal movement by an autopilot lockout cam 321. (FIG. 5). As shown in FIG. 5, the autopilot lockout device 47 includes a housing 323 mounted within the housing 215 and having a hollow piston 325 slidably mounted therein. The piston 325 has an annular flange 327 which is exposable to fluid under pressure from the conduit 123 (FIGS. 2A and 5).

The autopilot lockout cam 321 includes a cam section 329 and a leg section 331 which are rigidly interconnected to form a generally cranklike unit. The cranklike unit is pivotally mounted on a shaft 333 for pivotal movement. The shaft 333 is suitably mounted on suitable supporting structure such as the housing 215.

A plunger 335 which is movable axially within the hollow piston 325 is connected to the leg section 331 by a connecting rod 337. The piston 325 has open ends so that the connecting rod 337 and the plunger 335 can move axially within the piston 325 and relative thereto. A spring 339 acts between a shoulder 341 on the piston and the plunger 335 to urge the plunger to the right as viewed in FIG. 5 and to urge the lockout cam 321 downwardly or counterclockwise as viewed in FIG. 5. The counterclockwise movement of the leg section 331 is limited by the end face 342 of the piston against which the leg section is urged by the spring 339.

A roller 343 is pivotally connected by a pin 345 to the upper end of the arm 315. The lockout arm 321 can be moved counterclockwise a sufficient distance to engage and retain the roller 343. When no fluid under pressure is acting on the flange 327, the piston 325 is substantially freely axially movable within the housing 323 so that the lockout cam 321 would not be operative to retain the arm 315 in the neutral position shown in FIG. 5.

When fluid under pressure is supplied through the conduit 123 to the flange 327, it urges the piston 325 to the right as viewed in FIG. 5. Movement of the piston to the right tends to move the plunger 325 to the right because of the force of the spring 339 acting thereon. The fluid under pressure acting one the flange 327 moves the piston 325 to the right and pivots the lockout cam 321 counterclockwise as viewed in FIG. 5. The lockout cam 321 engages the roller 343 to retain the arm 315 in the neutral position shown in FIGS. 3 and 5. The lockout cam 321 is urged against the roller 343 by the force of the spring 339 rather than by the force of the fluid under pressure acting on the flange 327.

With this arrangement, the arm 315 is normally held stationary and the sole input to the operating element 213 is derived from the input actuators 25 and 25a. However, in the event of an emergency the pilot can manually turn the shaft 317 via linkage described hereinbelow and overcome he biasing force of the spring 339 to free the arm 315 from the lockout cam 321. When this occurs, the pilot can move the arm 315 to provide a second input to the operating element 213 through the auxiliary summing link 305. When this occurs, the movement of the end portion 311 and hence of the operating element 213 is the algebraic sum of the movements of the output member 223 and of the arm 315. Similarly, should there be a pressure failure in tee conduit 123, the piston and plunger would move freely together as a unit and there would be substantially no resistance to the pilot overcoming the effect of the lockout cam 321.

THE PRIMARY SUMMING LINK (FIGS. 3 and 6)

In the stability augmenting mode and in the event of an emergency where the pilot overcomes the force of the spring 339 (FIG. 5), the arm 315 is movable to provide a second input to the operating element 213. Movement of the arm is accomplished through the linkage shown in FIGS. 3 and 6.

An arm 347 is rigidly fixed to the shaft 317 for pivotal movement therewith and a link 349 is pivotally secured at one end to the upper end of the arm 347 and at the other end to the intermediate region 48 of the primary summing link 39. The lower end portion of the primary summing link 39 is connected to a pilot operated control member 350 by way of a mechanical connection 351 which may include a cable while the upper end of the link 39 is connected to the mechanical connection 43 and is driven by the actuator 51 as the actuator drives the flight control surface 13. The link 39 is pivotable about an axis 353 relative to the link 349.

With the autopilot lockout cam 321 engaging and retaining the upper end of the arm 315, the intermediate region 48 is held stationary. With this arrangement, the mechanical linkage 43 drives the summing link 39 about the axis 353 to thereby drive the pilot control member 350 through the linkage 351. However, with the lockout cam 321 disengaged to thereby free the arm 315 for pivotal movement, the links 349 and 39 and the axis 353 are free to move. With this arrangement, the movement of the axis 353 is a function of the movement of the end portions of the primary summing link 39 by the linkages 43 and 351. Stated differently the link 39 algebraically sums the motions imparted thereto by the linkages 43 and 351. For example, movement of the axis 353 to the right would pivot the shaft 317 clockwise as viewed in FIG. 6 to thereby tend to move the arm 315 clockwise and provide an input to the operating element 213 through the summing link 305.

OPERATION OF THE SYSTEM IN THE AUTOPILOT MODE

With the aircraft in flight, the various sensors within the computer 15 develop electrical control signals which are transmitted to the electrohydraulic valves 17 and 17a. Assuming that the solenoid valves 65 and 65a are energized, the valves 17 and 17a are immediately responsive to their respective control signals to direct fluid under pressure through the conduits 75, 77, 117 and 119 to the actuators 25 and 25a, respectively. Ideally, the valves 17 and 17a will operate to position the pistons 29 and 29a at corresponding locations with their respective cylinders. The transducers 34 and 34a (FIGS. 1 and 2A) provide a feedback signal to the computers indicating the position of the associated pistons 29 and 29a.

The pistons 29 and 29a carry the summing link 31 (FIG. 2A) with them. As shown in FIGS. 3 and 4, movement of the summing link 31 drives the gain link 217.

With both hydraulic systems operating satisfactorily, fluid at supply pressure is conducted through the conduits 63 and 63a to urge the pistons 281 and 283 upwardly against the restraining element 271. This urges the arm 221 upwardly against the biasing force of the spring 267 as shown in FIG. 4 to assure that the supper end of the gain link 217 will be unrestrained by the arm 221. Accordingly, the gain link 217 is free to pivot about the pivotal axis 245 thereof.

The gain link 217 pivots about the axis 245 and drives the output member 223 about its axis 299. In the autopilot mode, the lockout cam 321 engages the roller 343 to prevent movement of the arm so that the sole input to the operating element 213 is derived from motion of the output member 223.

With reference to FIG. 2B, the spool 135 which is driven by the operating element 213 is shown in the neutral position. Assuming that the spool 135 is moved to the left, fluid under pressure is then supplied from the conduit 67 through the groove and ports 157, the groove 189, the groove and ports 159 and the conduit 141 to the right-hand face of the piston 55. Fluid can return from the left-hand face of the piston 55 via the conduit 139, groove and ports 155, the annular groove 187, the ports 153, the annular groove and the return conduit 73. Similar flow paths are provided by the valve 37 to supply fluid from the conduit 111 through the conduit 145 to the right-hand face of the piston 55a while allowing return of fluid from the left-hand face of the piston 55a through the conduit 143 to the conduit 137. As shown in FIG. 2A, the fluid returning in the conduit 73 is fed to the sump 23 while the fluid returning from the conduits 137 is fed to the sump 120 through the housing for the gain mechanism.

Weight fluid pressure acting on the right-hand faces of the pistons 55 and 55a, the actuators shaft 201 moves to the left to impart a predetermined increment of movement to the flight control surface 13 through the mechanical linkage 43. The actuator shaft 201 is also connected by way of the mechanical linkage 43 (FIG. 6) to one end of the primary summing link 39. Accordingly, the primary summing link 39 is pivoted about the axis 353 to drive the pilot operated control element 350. The transducer 59 is driven by the actuator shaft 201 and provides a feedback signal to the computer 15 which is a function of the position of the pistons 55 and 55a.

In the autopilot mode, the pilot in an emergency can supply an input to achieve some control over the position of the flight control surface 13. This can be accomplished by the pilot exerting a substantial force on the control member 350 which in turn is transmitted through the link 39 (FIG. 6), the link 349, the arm 347, the shaft 317 and the arm 315 to the cam 321. The force applied to the curved lower surface of the lockout cam 321 tends to pivot the cam 321 against the biasing action of the spring 339. If the force applied is sufficient, it can overcome the biasing force of the spring 339 and "break out" from the lockout cam 321.

OPERATION OF THE SYSTEM IN THE STABILITY AUGMENTING MODE

The operation of the system in the stability augmenting mode is quite similar to that described above in connection with the autopilot mode. The transducers 34 and 34a in the stability augmenting mode are of the type which serve to indicate when the desired position of the pistons 29 and 29a has been reached. These transducers produce signals which are fed back to the computer 15, such signal being a function of the position of the pistons 29 and 29a.

In the stability augmenting mode, the autopilot lockout device 47 can be eliminated. Alternatively, is such device is provided, the valve 115 (FIG. 2A) can be arranged to supply no fluid under pressure thereto.

With no fluid under pressure being supplied through the conduit 123 to the piston 325 (FIG. 5) of the lockout device 47, the lockout cam 321 will be ineffective to retain the arm 315. Accordingly, the pilot may supply an input to the primary summing link 39 through the mechanical linkage 351 (FIG. 6). Similarly, the position of the flight control surface 13 is fed into the link 39 through the mechanical linkage 43. This causes displacement of the axis 353 of the link 39 to thereby impart pivotal movement to the shaft 317 (FIGS. 3 and 6). Pivotal movement of the shaft causes the arm 315 to pivot and to move the left end portion 309 to provide a composite input to the operating element 213. The operating element 213 provides control of the spool 135 in the manner described above in connection with the autopilot mode. The valve 37 controls the actuator 51 in the same manner as in the autopilot mode. The transducer 59 is not required in the stability augmenting mode.

OPERATION OF THE SYSTEM IN THE STABILITY AUGMENTING MODE AFTER A HYDRAULIC FAILURE

Assuming that a hydraulic failure and consequently loss of supply pressure occurs in the P1 system, there will be insufficient fluid pressure acting on the faces of the p9ston 29 to overcome the normal biasing tendency of the springs 95 and 99 (FIG. 2A). Accordingly, depending upon which way the piston 29 is shifted from the neutral position, one of the springs 95 and 99 will be operative to urge the piston to the neutral position shown in FIG. 2A. The input actuator 25a on the other hand will continue to function in a normal manner.

The result of the piston 29 remaining stationary at the neutral position while the piston 29a functions normally is to reduce the length of travel of the summing link 31 at the region 32. Specifically, with reference to the particular embodiment illustrated, the movement of the region 32 and hence of the region 247 (FIGS. 3 and 4) of the gain link 217 is cut in half when the actuator 25 fails. Accordingly, without the gain mechanism 33 the overall system 11 would function at one-half of the normal or full gain.

However, when pressure in the system P1 drops, there is a corresponding pressure drop in the conduit 63 (FIGS. 2A and 4) which derives its pressure from the source P1. Thus, the pistons 281 and 289 are no longer urged upwardly with significant force and the piston 283 which is responsive to the fluid under pressure in the conduit 63a is operative to urge the right-hand portion 279 of the restraining element 271 upwardly about the pivotal axis 275 to thereby depress the pistons 281 and 289. With the restraining element 271 pivoted counterclockwise, it is no longer operative to restrain the arm 221 against the force of the spring 267, and accordingly, the spring pivots the arms 221 about the axis 263 to cause engagement between the hook-shaped end portion 265 and the ball bearing 255 of the gain link 217. The surfaces 267 cam the bearing 255 to the upper end of the V-shaped groove formed thereby, as shown in FIG. 4A.

The gain link 217 is now mounted for pivotal movement about he axis 261. Subsequent movement imparted to the gain link 217 by the summing link 31 causes the gain link to pivot about the axis 261 and to move against the biasing force of the springs 237 and 241. In the specific embodiment illustrated, this change of pivotal axis results in a doubling of the gain of the gain mechanism 33. Although the input motion to the gain mechanism 33 is cut in half, the gain of the gain mechanism doubles automatically in response to a pressure failure so that the overall gain of the system 11 remains the same.

Of course, with the pressure in the system with the source P1 reduced, the valve section 49 of the valve 37 and the piston 55 are no longer operative to exert any controlling influence on the position of the flight control surface 13. The system operates, so far as positioning of the flight control surface 13 is concerned, as though no malfunction or pressure loss had occurred.

OPERATION OF THE SYSTEM IN THE AUTOPILOT MODE AFTER HYDRAULIC FAILURE

The operation of the system in the autopilot mode after a failure of the P1 system is identical to that described above for the stability augmenting system except that the lockout cam 321 prevents a pilot input to the system. If pressure system p2 fails, fluid pressure to the autopilot lockout device 47 is lost and the system thereafter operates in the stability augmenting mode as described above.

Although exemplary embodiments of the invention have been shown and described, may changes, modifications and substitution may be made by one having ordinary skill in the art without necessarily departing from the spirit and scope of this invention.

I claim:

1. In a force transmitting device for transmitting force from an input device to an output device, the combination of:
   a supporting structure;
   a first member;
   shiftable means for selectively pivotally mounting said first member on said supporting structure for pivotal movement about any one of a plurality of pivotal axes;
   an input member drivingly connectable to the input device and to said first member for driving said first member about any of said pivotal axes;
   an output member drivingly connectable to the output device and to said first member to drive said output device when said first member is pivoted about any of said pivotal axes, a characteristic of the motion of said output member being changed in relation to the motion of the input member as a result of said shiftable means changing the pivotal axis about which said first member pivots;
   said input member being a first input member;

a second movable input member for providing a second input; and summing means for algebraically summing the motion of the second input member and said output member for driving the output device.

2. A combination as defined in claim 1 wherein at least two of said pivotal axes are generally parallel.

3. In a force transmitting device for transmitting force from an input device to an output device, the combination of:
a supporting structure;
a first member;
shiftable means for selectively pivotally mounting said first member on said supporting structure for pivotal movement about any one of a plurality of pivotal axes;
an input member drivingly connectable to the input device and to said first member for driving said first member about any of said pivotal axes;
an output member drivingly connectable to the output device and to said first member to drive said output device when said first member is pivoted about any of said pivotal axes, a characteristic of the motion of said output member being changed in relation to the motion of the input member as a result of said shiftable means changing the pivotal axis about which said first member pivots; and
said plurality of pivotal axes including first and second pivotal axes, said first and second pivotal axes being generally parallel and extending through said first member, said input member driving said first member at a first region of the first member intermediate said first and second pivotal axes, said output member being driven by said first member at a second region of the first member intermediate said first and second pivotal axes and spaced from said first region whereby the length of movement of said output member in relation to the length of movement of said input member can be changed by pivoting said first member about said second pivotal axis rather than about said first pivotal axis.

4. A combination as defined in claim 3 including changeover means for operating said shiftable means to cause said shiftable means to change the pivotal axis about which said first member pivots.

5. A system connectable to first and second fluid pressure sources for controlling the position of a control surface of an aircraft, said system comprising:
means for producing a command signal;
first means for providing a first input motion related to said command signal when the pressure of each of said fluid pressure sources is above a predetermined level;
second means for providing a second input motion related to said command signal when the pressure of one of said fluid pressure sources drops below said predetermined level, said second input motion being less than said first input motion for a given value of said command signal;
gain means responsive to either of said input motions for providing a control motion, said gain means including means for establishing a first ratio between said first input motion and said control motion and means responsive to the pressure of said one fluid pressure source dropping below said predetermined level for establishing a second ratio between said second input motion and the control motion, said second ratio being greater than said first ratio to thereby at least partially compensate for the reduction in input motion due to the drop in pressure of said one fluid pressure source below said predetermined level; and
means responsive to said control motion for controlling the position of the control surface.

6. A system as defined in claim 5 wherein said second input motion is a preselected fraction of said first input motion for a given command signal and said second ratio is approximately the reciprocal of said preselected fraction whereby the reduction in fluid pressure of said one fluid pressure source beneath said predetermined level has substantially no effect on the length of the control motion obtainable.

7. A system connectable to first and second fluid pressure sources for controlling the position of a control surface of an aircraft, said system comprising:
first and second fluid responsive input devices connectable respectively to said first and second fluid pressure sources, each of said input devices providing an input motion and providing substantially no input motion when the pressure of the associated fluid pressure source falls below a predetermined level;
means for controlling said input devices to thereby control said input motions thereof;
means for averaging said input motions to thereby provide an average input motion, said average input motion being reduced when the pressure of one of the fluid pressure sources drops below said predetermined level;
gain means responsive to said average input motion for providing a control motion with the ratio of the average input motion to the control motion being at a predetermined value;
valve means for controlling the position of the control surface in accordance with said control motion; and
said gain means including means responsive to the reduction of fluid pressure in said one system to less than said predetermined level for increasing the ratio of the average input motion to the control motion to a value greater than said predetermined value to thereby at least partially compensate for the reduction in the average input motion.

78. A system as defined in claim 7 wherein said last mentioned means approximately doubles the ratio of the input motion to the control motion to thereby substantially completely compensate for the reduction in the average input motion as a result of the reduction of fluid pressure of said one fluid pressure source beneath said predetermined level.

9. In a force transmitting mechanism for transmitting force from an input device to an output device wherein the force transmitting mechanism is drivable by input motion from the input device, the combination of:
a supporting structure;
a first member drivingly connectable to the input device at a first region on the first member to permit the input device to impart the input motion thereto;
first releasable means for mounting said first member for pivotal movement about a first pivotal axis and for holding said first pivotal axis substantially stationary, said first releasable means being releasable to thereby permit movement of the first pivotal axis;
second releasable means for pivotable mounting said first member for pivotal movement about a second pivotal axis which is spaced from and generally parallel to said first pivotal axis while holding said second pivotal axis at least substantially stationary, said second releasable means being releasable to permit movement of the second pivotal axis whereby said first and second releasable means permit shifting of the axis about which said first member pivots; and
an output member drivingly connectable to the output device and to said first member at a second region thereof to drive the output device when the first member is being pivoted about at either of said pivotal axes, said first and second regions being spaced along said first member so that the shifting from said first pivotal axis to said second pivotal axis changes the gain of the force transmitting mechanism.

10. A combination as defined in claim 9 wherein said second releasable means includes an arm and means for mounting said arm on said supporting structure for movement toward and away from said first member, said arm being engageable with said first member to mount said first member for movement about said second pivotal axis.

11. A combination as defined in claim 10 including first biasing means for urging said arm into engagement with said first member and second biasing means for urging said arm away from said member, said second biasing means normally urging said arm out of engagement with said first member to thereby compress said first biasing means, and means for rendering said second biasing means ineffective to thereby permit said first biasing means to urge said arm into engagement with said first member to thereby cause said arm to mount said first member for pivotal movement about said second pivotal axis.

12. A combination as defined in claim 9 wherein said first releasable means includes a mounting member and means for pivotally interconnecting said first member and said mounting member to define said first pivotal axis, said first releasable means also including means for mounting said mounting member for movement and biasing means normally urging said mounting member into a predetermined position, said biasing means being sufficiently strong to at least substantially maintain said first pivotal axis against movement when said second releasable means is released but being yieldable to permit lateral movement of said first pivotal axis when said second releasable means is not released.

13. In a gain mechanism for transmitting motion to an output device wherein the input is obtained from first and second fluid pressure systems, the combination of:
first and second fluid responsive actuators for providing first and second input motions, respectively, said first and second actuators being operable by the first and second fluid systems, respectively, each of said actuators being capable of individual operations;
means for mounting said fluid actuators;
a first member;
shiftable means for selectively mounting said first member for pivotal movement about at least first and second pivotal axes;
means drivingly connected to a first region of said first member and to said fluid actuators for driving said first region of said first member in accordance with a first predetermined drive ratio when both of said actuators are functioning and for driving said first region of said member in accordance with a second predetermined drive ratio when only one of said actuators is functioning, the driving of said region causing the first member to pivot about either of said pivotal axes;
an output member drivingly connected to a second region of said first member and to said output device;
first means responsive to the fluid pressure systems maintaining the fluid pressures therein above a predetermined value for causing said shiftable means to mount said first member for pivotal movement about said first pivotal axis; and
second means responsive to the fluid pressure in at least one of the fluid systems dropping below said predetermined value for causing said shiftable means to mount said first member for pivotal movement about said second pivotal axis.

14. A combination as defined in claim 13 wherein the shifting from said first pivotal axis to said second pivotal axis changes the gain of the force transmitting mechanism to completely compensate for the change from said first drive ratio to said second drive ratio whereby the movement of the output member remains substantially uneffected by the loss of pressure in one pressure system and the resultant discontinuance of the operation of one of said actuators.

15. A combination as defined in claim 13 wherein said means drivingly connected to the first region of the first member includes a driving member pivotally connected to said first region of said first member for pivotal movement about a third pivotal axis which is generally transverse to the first and second pivotal axes, first and second portions of said driving member projecting on opposite sides of said third pivotal axis and being drivingly connected to the first and second actuators, respectively, whereby either of said actuators can drive said first member and the movement of said first member is a function of the first and second input motions.

16. A combination as defined in claim 13 wherein said first means includes first and second movable pressure responsive members in communication with the fluid in the first and second fluid systems, respectively, the pressure of the fluid in the fluid systems driving each of the movable members to a first position when the pressure is above said predetermined value, and means responsive to both of said movable members being in said first position for causing the shiftable means to mount said first member for pivotal movement about said first pivotal axis.

17. A combination as defined in claim 10 wherein said second means includes drive means for moving said first movable member out of said first position when the fluid pressure in the first fluid pressure system drops below said predetermined value, drive means for moving said second movable member out of said first position when the fluid pressure in the second fluid pressure system drops below said predetermined value, and means responsive to either of said movable members being out of said first position for causing said shiftable means to mount said first member for pivotal movement about said second pivotal axis.

18. In a force transmitting mechanism for transmitting motion from an input device to an output device, the combination of:
a supporting structure;
a gain link;
a mounting member pivotally connected to said gain link at a first region thereof to mount said gain link for pivotal movement about a first pivotal axis;
means for mounting said mounting member for movement along a predetermined path;
means for biasing said mounting member to a predetermined position and to releasably retain said mounting member at said predetermined position
an arm mounted for movement on said supporting structure toward and away from a second region of said gain link;
means for urging said arm toward said second region of said gain link and into engagement with said second region of said gain link;
means on at least one of said arm and said gain link for pivotally mounting said gain link about a second pivotal axis lying closely adjacent said second region of said gain link when said arm is biased into engagement with said second region of said gain link;
an input member mounted on said gain link at a third region thereof; and
an output member drivingly connected to said gain link at a fourth region of said gain link, said third and fourth regions being spaced from each other, said pivotal axes being spaced from each other, each of said pivotal axes being spaced from at least one of said third and fourth regions of said gain link.

19. A combination as defined in claim 12 wherein said pivotal axes lie closely adjacent the opposite ends of said gain link and said third and fourth regions lie intermediate said pivotal axes.

20. A combination as defined in claim 12 wherein said output member is mounted for pivotal movement about a third pivotal axis which is generally parallel to said second pivotal axis.

21. A combination as defined in claim 12 wherein said arm is pivotally mounted on said supporting structure for pivotal movement toward and away from said other end of said gain link, said arm having a recess therein with generally sloping sidewalls to cradle said second region of said gain link and to cause said first region of said gain link to assume a preselected position with relation to said recess when said arm is in engagement with said region of said gain link.

22. A combination as defined in claim 18 including a restraining element pivotally mounted on said arm for pivotal movement about a third pivotal axis, first and second force applying means for applying a force to said restraining element on opposite sides of said third pivotal axis to thereby urge the arm out of contact with said second region of said gain link and against the force of said means for urging whereby the failure of one of said force applying means to apply the requisite force to said restraining element causes the other of said force applying means to pivot said restraining element about said third pivotal axis to thereby allow said means for urging to urge said arm into engagement with said second region of said gain link.

23. In an actuator the combination of:
a supporting structure;
an actuator member;
means for pivotally mounting said actuator member on said supporting structure for pivotal movement about a first pivotal axis;
biasing means for urging said actuator member a limited distance in a first direction about said first pivotal axis;
biasing means for urging said actuator member a limited distance in a first direction about said first pivotal axis;
a restraining element;
means for mounting said restraining element on said actuator member for pivotal movement about a second pivotal axis, portions of said restraining element projecting on opposite sides of the second pivotal axis, said pivotal axes being generally parallel
first force applying means for applying a first force to one of said portions of said restraining element;
second force applying means for applying a second force to the other of said portions of said restraining element, both of said forces being applied in a direction generally opposite to said one direction and being of such magnitude and so positioned with relation to said second pivotal axis so as to impart substantially no pivotal movement to said restraining element about said second pivotal axis; and
said forces normally being of sufficient magnitude to move said actuator member a limited distance in said opposite direction about said first pivotal axes whereby upon a predetermined decrease in magnitude of one of said forces, said restraining element pivots about said second pivotal axis and said biasing means becomes operative to urge said actuator member in said first direction.

24. A combination as defined in claim 17 wherein said first and second force applying means includes first and second movable pressure responsive members, respectively, each of said movable members being in communication with a separate fluid pressure system whereby the fluid pressure of each of said systems creates said forces and said actuator member is moved in said one direction by said biasing means in response to a pressure loss in either of said fluid systems.

25. In a system for controlling the movement of a controllable member, the combination of:
first and second sources of fluid under pressure;
first and second fluid responsive input devices, each of said first and second fluid responsive input devices including a pressure responsive drive member, said drive members of said first and second input devices being communicable with and drivable by the first and second sources of fluid under pressure, respectively, the motion of either of said drive members at least substantially ceasing in response to a predetermined loss of pressure in the associated source of fluid under pressure;
means for controlling the admission of fluid under pressure to said drive member to thereby control the movement thereof;
summing means for algebraically summing the length of the motions of said drive members to produce an input motion;
an actuator for controlling movement of the controllable member;
operator means having a movable operating element, said operator means being responsive to movement of said operating element to control the actuator; and
a gain mechanism for transmitting the input motion of the operating element in accordance with a first predetermined ratio, said gain mechanism including means responsive to the predetermined loss of pressure in either of said systems for transmitting the input motion to the operating element in accordance with a second predetermined ratio which is different from said first predetermined ratio.

26. A combination as defined in claim 20 wherein the loss of pressure in either of said sources of fluid under pressure reduces the input motion and said second ratio is sufficiently greater than said first ratio to at least substantially compensate for the decrease in input motion whereby the movement of the controllable member is substantially uneffected by the loss of pressure in said one source of fluid under pressure.

27. A combination as defined in claim 25 wherein said summing means includes a summing link drivably connectable to both of said drive members.

28. A combination as defined in claim 20 wherein said input motion is a first input motion, the combination including means for supplying a second input motion to said gain mechanism, said first input being subjectable to one of said predetermined ratios depending upon the pressure in said systems to provide a preliminary control motion, means for algebraically summing said second input motion and said preliminary control motion to provide a final control motion and means for transmitting the final control motion to the operating element to control the latter.

29. In a control system responsive to at least first and second variable conditions for controlling a movable member, the combination of:
first and second input means responsive to the first condition for providing a first input motion, the length of said first input motion being altered in response to a failure of one of said first and second input means;
a variable gain mechanism for converting said first input motion into a preliminary control motion, said variable gain mechanism including means responsive to both of said first and second input means functioning normally for converting the first input motion into the preliminary control motion at a first gain and means responsive to the failure of one of said first and second input means for converting the first input motion to said preliminary control motion at a second gain;
third input means responsive to the second condition for providing a second input motion;
summing means for algebraically summing the second input motion and the preliminary control motion to produce a final control motion; and
means for transmitting the final control motion to the movable member to thereby control the movement thereof.